United States Patent
Desclaux

(10) Patent No.: US 8,533,826 B2
(45) Date of Patent: Sep. 10, 2013

(54) METHOD FOR PROTECTING THE SOURCE CODE OF A COMPUTER PROGRAM

(75) Inventor: Fabrice Desclaux, Montigny le Bretonneux (FR)

(73) Assignee: European Aernautic Defence and Space Company—EADS France, Paris (FR)

( * ) Notice: Subject to any disclaimer, the term of this patent is extended or adjusted under 35 U.S.C. 154(b) by 0 days.

(21) Appl. No.: 13/202,849

(22) PCT Filed: Feb. 23, 2010

(86) PCT No.: PCT/EP2010/052279
§ 371 (c)(1),
(2), (4) Date: Dec. 29, 2011

(87) PCT Pub. No.: WO2010/097383
PCT Pub. Date: Sep. 2, 2010

(65) Prior Publication Data
US 2012/0096562 A1    Apr. 19, 2012

(30) Foreign Application Priority Data
Feb. 24, 2009   (FR) ...................................... 09 51162

(51) Int. Cl.
*H04L 29/06*        (2006.01)
(52) U.S. Cl.
USPC ............... 726/22; 713/167; 713/193; 726/23
(58) Field of Classification Search
USPC ........................................................ 726/22
See application file for complete search history.

(56) References Cited

U.S. PATENT DOCUMENTS

| | | | | |
|---|---|---|---|---|
| 5,815,714 | A * | 9/1998 | Shridhar et al. | 717/129 |
| 6,594,761 | B1 | 7/2003 | Chow et al. | |
| 7,080,359 | B2 * | 7/2006 | Ullmann et al. | 717/128 |
| 7,162,735 | B2 * | 1/2007 | Safa | 726/6 |
| 7,171,693 | B2 * | 1/2007 | Tucker et al. | 726/26 |
| 7,823,135 | B2 * | 10/2010 | Horning et al. | 717/127 |
| 8,108,689 | B2 * | 1/2012 | Nicolson et al. | 713/190 |
| 8,161,463 | B2 * | 4/2012 | Johnson et al. | 717/136 |
| 2006/0253687 | A1 * | 11/2006 | Jakubowski et al. | 712/210 |
| 2007/0199074 | A1 * | 8/2007 | LeVine et al. | 726/26 |

FOREIGN PATENT DOCUMENTS

| | | |
|---|---|---|
| WO | 99/01815 A1 | 1/1999 |
| WO | 2005/020068 A2 | 3/2005 |

OTHER PUBLICATIONS

"The IOCCC Flight Simulator", Carl Banks, The 1998 International Obfuscated C Code Contest, 1998.*
Collberg et al; "Watermarking, tamper-proofing, and obfuscation-tools for software protection", IEEE Transactions on Software Engineering, vol. 28, No. 8, Aug. 1, 2002, pp. 735-746, ISSN: 0098-5589.

(Continued)

*Primary Examiner* — Taghi Arani
*Assistant Examiner* — Mohammad L Rahman
(74) *Attorney, Agent, or Firm* — Pearne & Gordon LLP

(57) ABSTRACT

A method for protection of a computer program source code comprising the following steps: translating said source code into a target code, generating an object code starting from said target code, applying an obfuscation program to protect said source code. The obfuscation step is executed after the source code has been translated into target code and before the generation of said object code.

6 Claims, 1 Drawing Sheet

(56) References Cited

OTHER PUBLICATIONS

Cohen; "Operating System Protection Through Program Evolution" Computers & Security, vol. 12, No. 6, Oct. 1, 1993, pp. 565-584, ISSN: 0167-4048.

International Search Report for PCT/EP2010/052279 dated Nov. 5, 2011.

French Preliminary Search Report for FR 09 51162 dated Oct. 2, 2009.

* cited by examiner

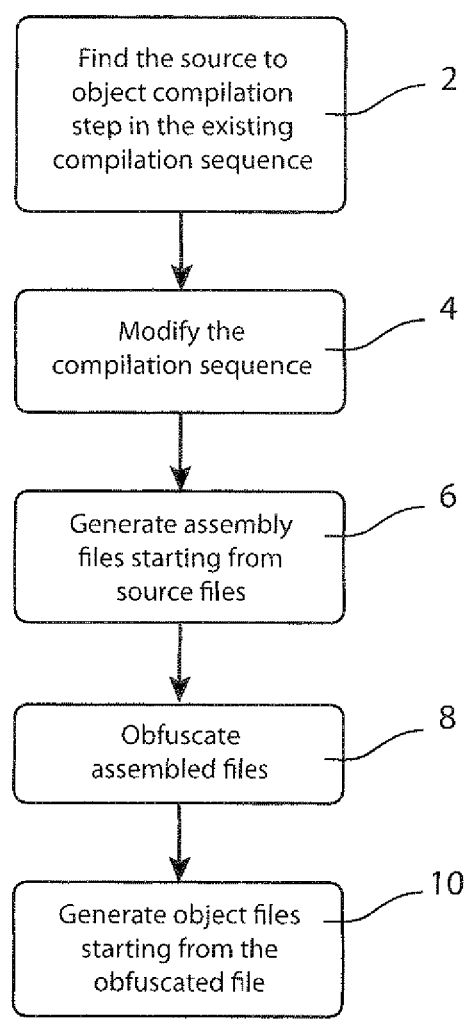

METHOD FOR PROTECTING THE SOURCE CODE OF A COMPUTER PROGRAM

TECHNICAL FIELD

The field of this invention is the protection of computer data and programs and more specifically it concerns a method for obfuscating a computer program to prevent disassembly, in other words reconstruction of the source code starting from the executable code, and/or the modification with patches by unauthorised persons.

The invention also relates to a computer program recorded on a medium and comprising instruction lines that, when executed by a computer, can obfuscate said program.

The invention also relates to use of the method according to the invention to obfuscate a computer program recorded on a medium and that will perform the functions of a flight simulator when it is executed on a computer.

STATE OF PRIOR ART

Known techniques for the obfuscation of computer programs are based essentially on the use of utility programs called packers, the function of which consists of compressing the executable program (.exe, .dll, .ocx, etc.) and simultaneously encrypting it.

Therefore packers are composed of two parts:
- the compression/encryption routine external to the compressed program;
- the decompression/decryption routine onboard the compressed program.

Packers are more appropriate for protection against copies than for program obfuscation. There are also software tools called unpackers that are capable of automatically eliminating the protection made on a program by means of a packer. Moreover packers introduce transformations to the program to be protected that make execution more complex.

Furthermore, in techniques according to prior art, packers act on the binary version of the compiled program. This makes it impossible to find the semantic information that was used for obfuscating. These packers can also act on the source program. One disadvantage of this method is due to the fact that the resulting obfuscation is not reliable and can be truncated during the compilation/optimisation phase.

One purpose of the invention is to make simple and efficient obfuscation independent of the source language of the program to be obfuscated.

Another purpose of the invention is to conceal program transformations.

PRESENTATION OF THE INVENTION

These purposes are achieved by means of an obfuscation method that consists of inserting processing steps before the object code is generated such that the obfuscation acts on the machine language generated after optimisation.

This method comprises the following steps:
- translating the source code of the program to be obfuscated into a target code,
- generating an object code starting from said target code,
- applying an obfuscation program to protect said source code, According to the invention, the obfuscation step is executed after the source code has been translated into a target code and before said object code is generated.

Said obfuscation program also comprises a step to optimise said target code.

Preferably, said source code is written in a high level language with a high abstraction level and said target code is in assembly language.

In one preferred embodiment, the obfuscation program consists of modifying at least one line of the target code so as to prevent reproduction of the source code by disassembling the object code and by analysing the target code obtained by this disassembly.

Said obfuscation program comprises the following steps to achieve this purpose:

a—selecting a numeric variable V used by said program or an instruction of said program using said numeric value V, b—defining at least one operation, execution of which provides said numeric value V, c—substituting at least one line of said program by a new program line performing said operation.

According to another characteristic, the method according to the invention also comprises a step that consists of assembling the new program line to obtain opcodes from it and to use the opcodes obtained as operands of the operation providing the numeric value V.

In a first variant, the value of said numeric variable V is then replaced by the result of the previously defined operation.

In another variant, the numeric coding of said instruction is replaced by the memory address pointed at by the previously defined operation.

Steps a), b) and c) are repeated recursively.

The method according to the invention is used by a computer program recorded on a medium and comprising instruction lines that, when executed by a computer, obfuscates said program in accordance with steps a) b) and c).

The method according to the invention can be used to obfuscate a computer program recorded on a medium and that will perform the functions of a flight simulator when executed by a computer.

BRIEF DESCRIPTION OF THE DRAWINGS

Other characteristics and advantages of the invention will become clear after reading the following description taken as a non-limitative example with reference to the appended FIGURE showing the essential steps in the method.

PARTICULAR EMBODIMENTS

The invention is applicable to obfuscating a computer program recorded on a medium and that, when executed by a computer, will perform simulation functions, processing of security data and management of industrial processes.

In general, the method according to the invention is applicable to all computer programs comprising a plurality of instruction lines written in a source language and that will be translated by a compiler into a target language. For example, the source language may be a programming language with a high degree of abstraction and the target language is an assembly language or a machine language called object code.

The appended FIGURE illustrates the essential steps in the method according to the invention.

Step 2 consists of finding the compilation step from the source code to the object code in the existing compilation sequence.

Step 4 consists of inserting steps 6, 8 and 10 into the compilation step.

Step 6 consists of generating files in assembly language starting from files in the source language while maintaining optimisation options associated with the compilation phase.

Step 8 consists of applying the obfuscation program to files in assembly language to generate files in obfuscated assembly languages. In this case, the obfuscation program performs a function similar to a code optimiser.

Step 10 consists of generating object files starting from files in assembly language.

Inserting the obfuscating program has very little impact on a project under development. The only modification made to the compilation sequence is the addition of an instruction calling the obfuscating program during generation of the file in machine language. This is done by specifying an option in the compiler command line. The obfuscation program then uses information contained in the file in generated machine language, obfuscates it and regenerates a file in machine language which will then be reused in the following compilation steps.

This solution makes obfuscation independent from the source language. The obfuscation program also acts as close to machine language as possible but with a good information level, and therefore enables a precise obfuscation.

The invention claimed is:

1. Method for protection of source code of a computer program comprising the following steps:
   a—translating said source code into a target code,
   b—generating an object code starting from said target code,
   c—applying an obfuscation program to protect said source code, wherein said obfuscation program is executed after the source code has been translated into a target code and before said object code is generated and comprises the following steps:
   d—replacing at least one line of said computer program by a new program line performing an operation which provides a numeric variable V used by said computer program or an instruction of said computer program,
   e—assembling one line of the resulting computer program to obtain opcodes,
   f—using the opcodes obtained as operands of the operation providing the numeric variable V, and
   g—replacing said numeric variable V by the result of the operation described by said new program line.

2. Method according to claim 1, in which said obfuscation program also comprises an optimisation step of said target code.

3. Method according to claim 2, in which said source code is written in a high level language with high abstraction level and said target code is in assembly language.

4. Method according to one of claims 1 to 3, in which said obfuscation program consists of modifying at least one line of the target code so as to prevent reproduction of the source code by disassembly of the object code and by analysis of the target code obtained by the disassembly.

5. Method according to claim 1, in which steps d) to e) are repeated recursively.

6. Computer readable storage device storing a program comprising instruction lines that, when executed by a computer obfuscates a computer program in accordance with a method comprising the following steps:
   a—translating said source code into a target code,
   b—generating an object code starting from said target code,
   c—applying an obfuscation program to protect said source code, wherein said obfuscation program is executed after the source code has been translated into a target code and before said object code is generated and comprises the following steps:
   d—replacing at least one line of said computer program by a new program line performing an operation which provides a numeric variable V used by said computer program or an instruction of said computer program,
   e—assembling one line of the resulting computer program to obtain opcodes,
   f—using the opcodes obtained as operands of the operation providing the numeric variable V, and
   g—replacing said numeric variable V by the result of the operation described by said new program line.

\* \* \* \* \*

UNITED STATES PATENT AND TRADEMARK OFFICE
CERTIFICATE OF CORRECTION

PATENT NO.        : 8,533,826 B2
APPLICATION NO. : 13/202849
DATED             : September 10, 2013
INVENTOR(S)       : Fabrice Desclaux It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 55 days.

Signed and Sealed this
Fifteenth Day of September, 2015

Michelle K. Lee
*Director of the United States Patent and Trademark Office*